United States Patent
Cheek

(12) 
(10) Patent No.: US 8,839,741 B2
(45) Date of Patent: Sep. 23, 2014

(54) LITTER BOX CLEANING KIT

(76) Inventor: Bradley Cheek, Orlando, FL (US)

( * ) Notice: Subject to any disclaimer, the term of this patent is extended or adjusted under 35 U.S.C. 154(b) by 394 days.

(21) Appl. No.: 13/453,329

(22) Filed: Apr. 23, 2012

(65) Prior Publication Data
US 2013/0277509 A1 Oct. 24, 2013

(51) Int. Cl.
 *B65B 67/04* (2006.01)
 *A01K 29/00* (2006.01)

(52) U.S. Cl.
USPC ............ 119/161; 248/99; 248/100; 248/101; 199/165; 199/166; 199/162; 199/163; 199/164; 199/167; 199/168; 199/169; 199/170; 220/23.2; 220/23.87; 220/23.88; 220/752; 220/757; 294/1.3; 294/1.4; 294/1.5; 294/137; 294/159; 294/160; 294/176; 294/179; 294/180; 294/146

(58) Field of Classification Search
USPC ............ 248/99, 100, 101; 119/161, 165, 166, 119/162, 163, 164, 167, 168, 169, 170; 220/23.2, 23.87, 23.88, 752, 757, 758, 220/908, 908.1; 294/1.3, 1.4, 1.5, 137, 159, 294/160, 176, 179, 180, 146; 206/223
See application file for complete search history.

(56) References Cited

U.S. PATENT DOCUMENTS

| | | | | |
|---|---|---|---|---|
| 4,061,242 A * | 12/1977 | Donlon | | 220/506 |
| 5,076,627 A * | 12/1991 | Simon | | 294/1.3 |
| 5,134,974 A * | 8/1992 | Houser | | 119/168 |
| 5,540,469 A * | 7/1996 | Albert | | 294/1.4 |
| 5,713,616 A * | 2/1998 | Knudson | | 294/1.3 |
| 5,775,258 A * | 7/1998 | Larsen et al. | | 119/161 |
| 5,839,771 A * | 11/1998 | DeMars | | 294/146 |
| 5,855,186 A * | 1/1999 | Larsen et al. | | 119/166 |
| 6,267,078 B1 * | 7/2001 | Pina | | 119/165 |
| 8,544,906 B2 * | 10/2013 | Northrop et al. | | 294/1.4 |
| 2004/0164568 A1 * | 8/2004 | Diehl | | 294/1.4 |
| 2009/0001738 A1 * | 1/2009 | Amerena | | 294/1.4 |
| 2009/0038553 A1 * | 2/2009 | Lin et al. | | 119/166 |
| 2011/0049917 A1 * | 3/2011 | Northrop et al. | | 294/1.4 |

* cited by examiner

*Primary Examiner* — Christopher Garft
(74) *Attorney, Agent, or Firm* — Jason T. Daniel, Esq.; Daniel Law Offices, P.A.

(57) ABSTRACT

A litter box cleaning kit includes a litter shovel having a nonporous bottom section for collecting non-solid waste, a curved section having a plurality of openings for collecting and sifting solid waste, a bag holder for positioning disposal bags in an open configuration and a caddy for storing each of the shovel, bag holder and disposal bags.

8 Claims, 5 Drawing Sheets

LITTER BOX CLEANING KIT

TECHNICAL FIELD

The present invention relates generally to animal litter cleaning devices, and more particularly to cat litter cleaning kit capable of quickly and easily cleaning dirty litter boxes.

BACKGROUND

The statements in this section merely provide background information related to the present disclosure and may not constitute prior art.

As any domestic cat owner will attest, one of the less desirable aspects of pet ownership revolves around the removal of waste such as urine and excrement. To this end, domestic cat owners employ the use of conventional litter boxes which contain cat litter for collecting the waste.

Until recently, litter scoops/cat shovels were used only to remove solid feline feces, however, since the advent of the more modern, expensive, "clumping" cat-litter, they are also used to remove urine. This is made possible because the urine turns into a solid clump which can be removed with any ordinary cat-litter scooper, even though the scooper is full of holes. Unfortunately, there are two major disadvantages to using this self clumping litter. The first disadvantage is that self-clumping litter is markedly more expensive than regular, non-clumping cat-litter. Owing to this, many pet owners choose to utilize non-clumping litter and simply discard the entire cat-litter box contents just to dispose of a few odorous wet-spots. The second disadvantage revolves around recent medical studies which suggest a potential link between the self-clumping cat litter and feline cancer.

As a result, pet owners must constantly clean litter boxes using a plurality of different tools such as scoops and plastic bags, for example. Many pet owners also utilize leftover grocery bags as a container for the used cat litter. These bags are often stored in different locations from other litter cleaning devices, and can be difficult to find in times of need.

Accordingly, there remains a need in the art for a litter box cleaning kit which is capable of providing a plurality of tools for maintaining a litter box in a compact, space saving manner that is easy to use and locate.

SUMMARY OF THE INVENTION

The present invention is directed to a litter box cleaning kit. One embodiment of the present invention can include a litter shovel having a nonporous bottom section configured to collect non-solid waste, and a curved section having a plurality of openings for sifting solid waste. The kit also includes a bag holder for positioning disposal bags in an open configuration and a caddy for storing each of the shovel, bag holder and disposal bags.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
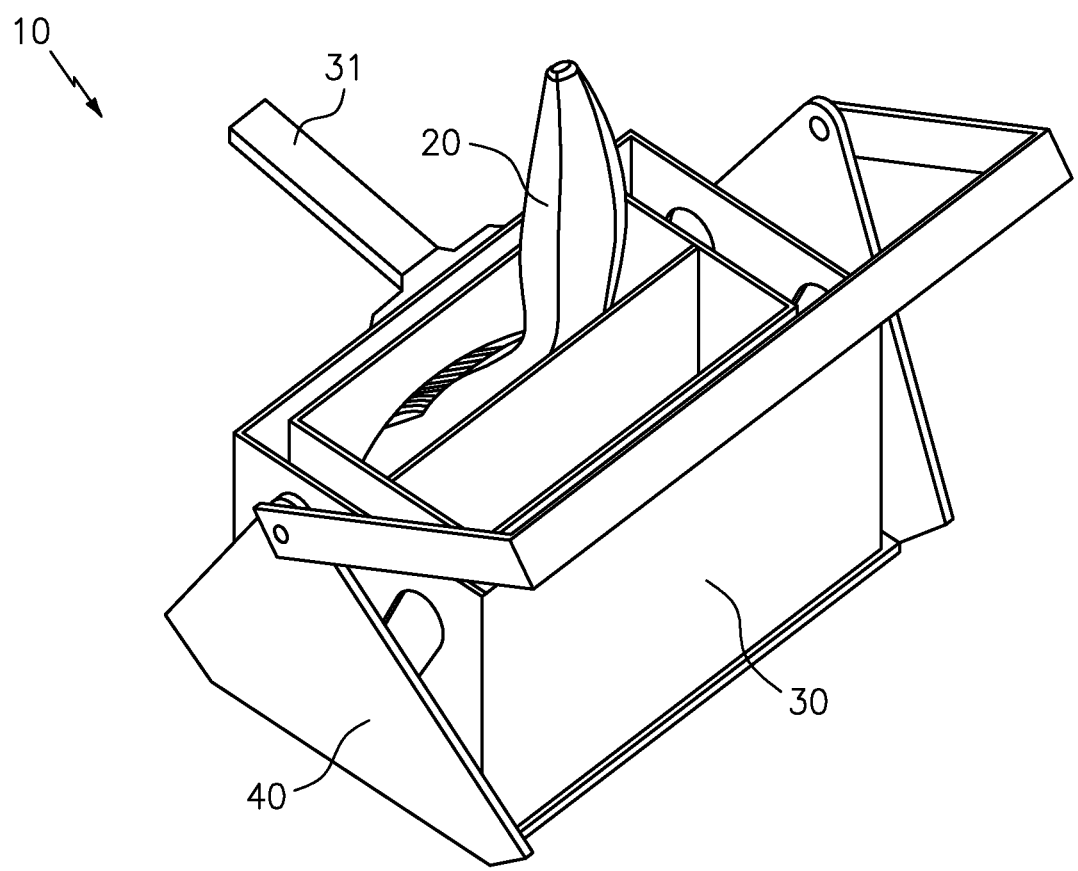
FIG. 1 is a perspective view of the litter box cleaning kit that is useful for understanding the inventive concepts disclosed herein.

For purposes of this description, the terms "upper," "bottom," "right," "left," "front," "vertical," "horizontal," and derivatives thereof shall relate to the invention as oriented in FIG. 1.

FIG. 1 illustrates one embodiment of a litter cleaning kit 10 in a stowed orientation that is useful for understanding the inventive concepts disclosed herein. The kit itself can include an improved litter shovel 20, a bag holder 30 and a storage caddy 40.

Figure 2B:
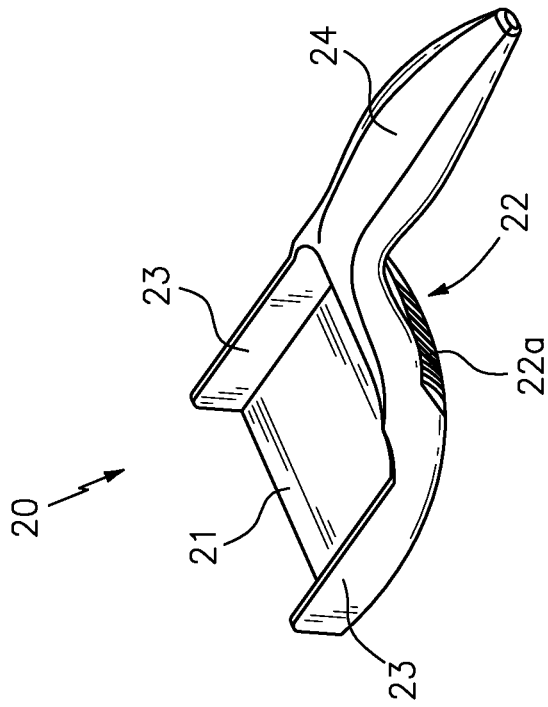
FIG. 2b is another perspective view of the improved litter shovel included with the kit, in accordance with one embodiment of the invention.
Figure 2A:
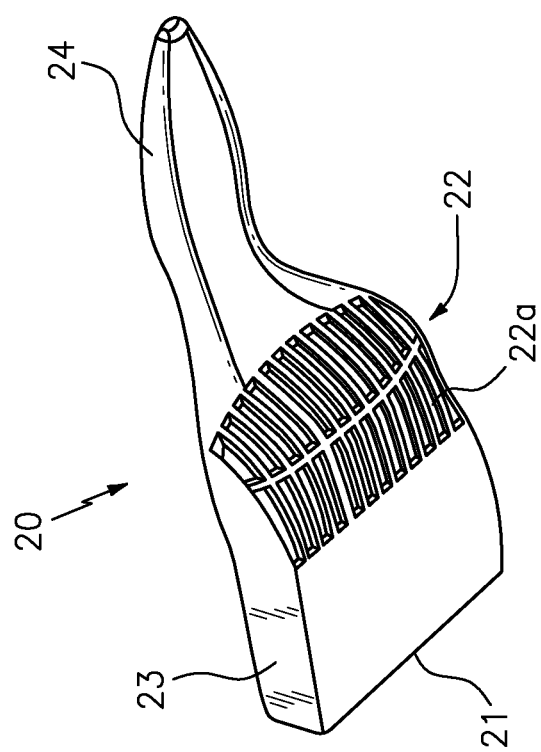
FIG. 2a is a perspective view of an improved litter shovel included with the kit, in accordance with one embodiment of the invention.

FIGS. 2a and 2b illustrate one embodiment of an improved litter shovel 20 that is provided with the kit. As shown, shovel 20 includes a flat, generally planar bottom scooping section 21 terminating into an angled sifting section 22 that includes multiple openings 22a, a pair of side walls 23 bracket the sections, and an elongated handle 24 connects to each of the scooping section and side walls and protrudes outward. The elongated handle 24 has a generally parallel relationship with the bottom section 21.

The improved litter shovel 20 can act as a device for quickly and effectively removing both solid and liquid waste from litter. To this end, the front scooping section 21 preferably includes a generally flat, non-perforated member onto which loose material of varying consistencies (such as wet non-clumping cat litter, for example) can be placed. Owing to the absence of holes/perforations, this front scooping section shall function as a retrieval tool for wet litter that would otherwise not be retrievable by litter shovels having perforations anywhere near the front scoop area.

The angled sifting section 22 can act as an area for receiving solid waste. To this end, the multiple openings 22a, which can be of any shape, size and dimension can act as a sifting tool/strainer for removing the fine particles of cat litter from the solid waste. This can be accomplished according to known practices such as shaking and the like. The side walls 23 act in a traditional manner to prevent items located on the scooping section 21 and/or sifting section 22 from falling off.

Accordingly, by including a flat non-porous front surface with an angled porous rear section, the improved litter shovel can act to remove waste and litter from a litter box in a quick and easy manner.

Figure 3A:
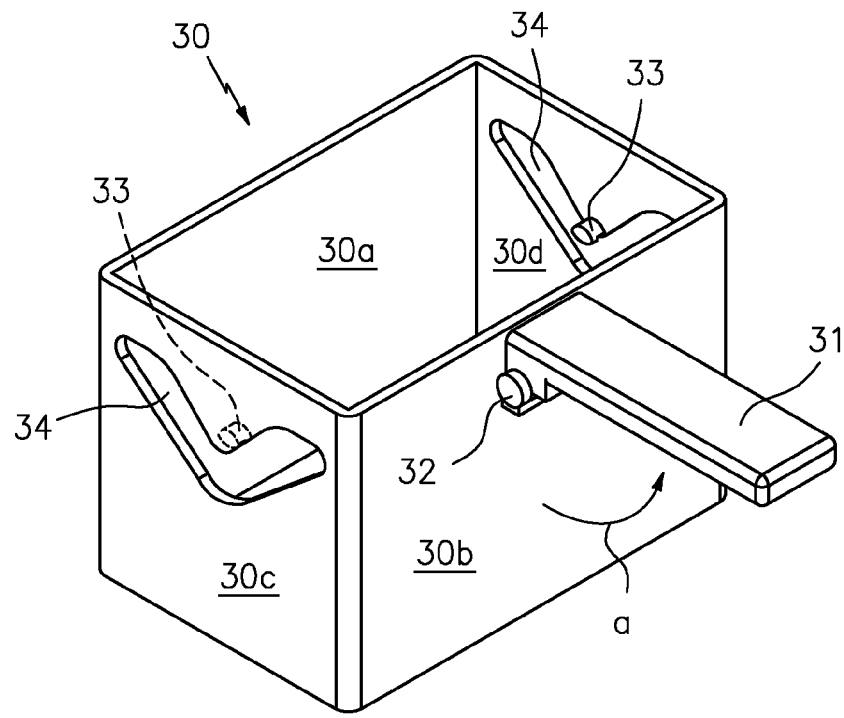
FIG. 3a is a perspective view of a bag holder included with the kit, in accordance with one embodiment of the invention.
Figure 3B:
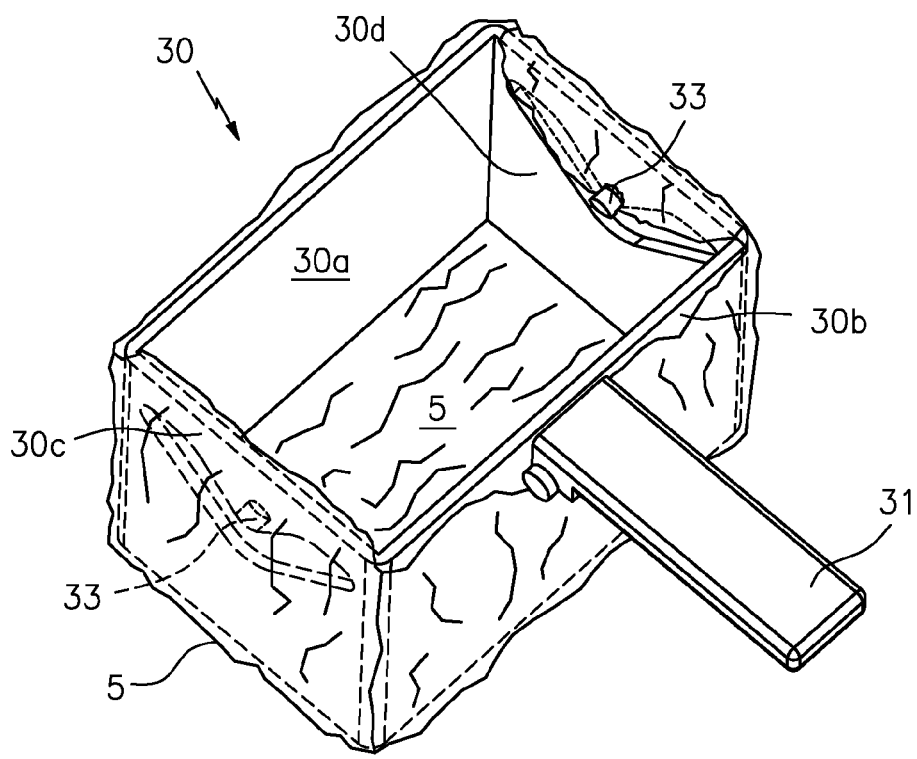
FIG. 3b is a perspective view of the bag holder in operation, in accordance with one embodiment of the invention.

FIGS. 3a and 3b illustrate one embodiment of a bag holder 30 that is included with the kit. The bag holder 30 can act as a device for positioning a bag or other such item in an open configuration in order to act as a receptacle for soiled litter. In one preferred embodiment, the bag holder will include dimensions for securely holding conventional plastic shopping bags 5 such as those commonly utilized by grocery stores.

As shown, the holder 30 can include a front surface 30a, back surface 30b, side surface 30c and opposing side surface 30d each forming a generally rectangular shape having an open top and bottom end through which a bag 5 can be positioned. A handle 31 can be secured to the back surface 30b of the main body for handling by a user. In one embodiment, handle 31 can be secured to the main body via a locking hinge 32 capable of allowing the handle to rotate between an extended and collapsed position (See arrow a). Alternately, the handle 31 can be affixed to the main body via a weld or other permanent manner, or can be removably secured to the main body via a bolt or other such compression fitting.

Each of the side surfaces can also include an inward facing hook/protrusion 33 in order to engage the handles of the plastic bag 5, as shown in FIG. 3b. Additionally, optional openings 34 can be included on each of the side surfaces for allowing side access to the interior area of the main body 30 (i.e., the open space defined by walls 30a-30d). To this end, the device 30 can act to support a plastic bag 5 in an open configuration for receiving spent litter.

Although described above as including inward facing protrusions, other known devices such as clips and the like can be included to secure the bag to the holder 30.

Figure 4:
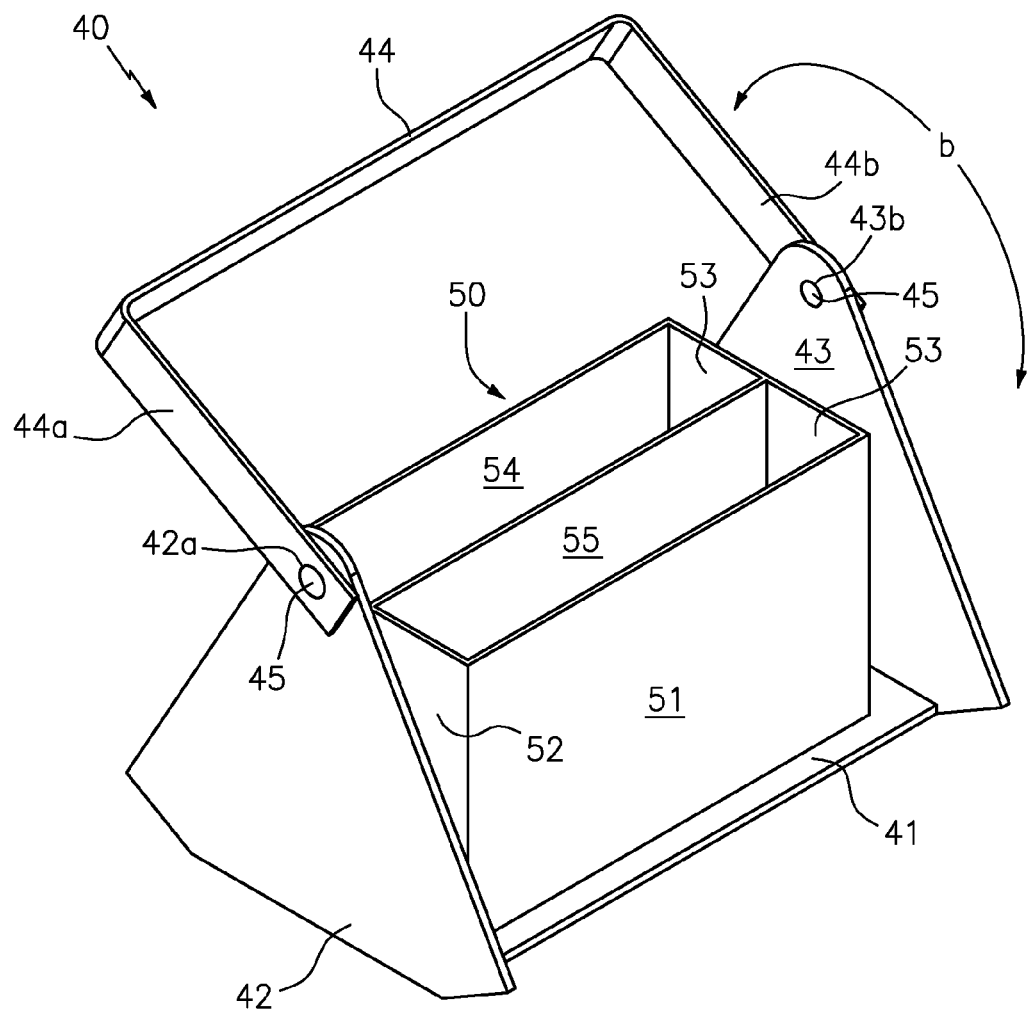
FIG. 4 is a perspective view of a caddy included with the kit, in accordance with one embodiment of the invention.

FIG. 4 illustrates one embodiment of a storage caddy 40 that is included with the kit. As shown, caddy 40 can include a flat, generally rectangular bottom surface 41 supporting a pair of upward facing side walls 42 and 43. A moveable handle 44 can be secured to each of the side members. As described herein, handle 44 can include a metallic arm having a generally U shape wherein both ends 44a and 44b are secured through openings 42a and 43a, respectively via a pin 45 or other known device capable of allowing the handle to be rotatably secured to the caddy. Alternatively, handle 44 can include a flexible tether, such as a nylon strap, for example.

A storage box 50 can be secured onto the bottom surface 41 at a central location between the side walls 42 and 43. As will be described below, bottom surface 41 can extend beyond the outer boundaries of the storage box 50 in order to provide a shelf onto which the bag holder 30 can be placed. As shown, storage box 50 can take the shape of a generally rectangular box having a front wall 51, opposing side walls 52 and 53, back wall 54, and a central vertical partition wall 55. The bottom of the box 50 can be capped via the bottom surface 41, and the top of the box 50 can be open, resulting in two storage areas configured to receive and store a variety of items.

In one preferred embodiment, storage box 50 can act to store the litter shovel 20 and a plurality of unused bags 5. Although the vertical partition 55 is illustrated as being located in the center of the box 50, thus resulting in two evenly dimensioned storage areas, other embodiments in which the two storage spaces are not equally sized are also contemplated.

Figure 5:
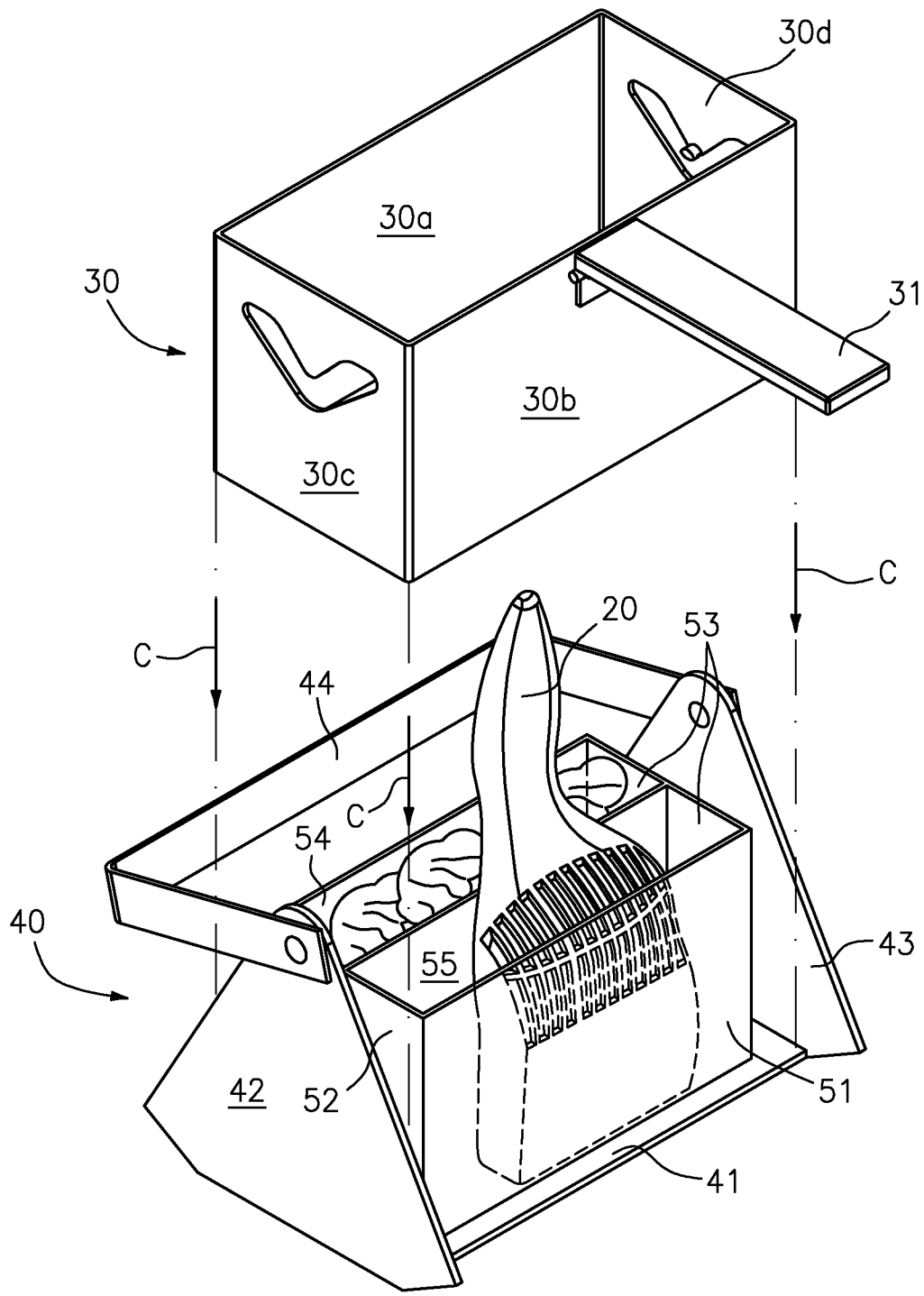
FIG. 5 is an exploded parts view of the litter box cleaning kit in accordance with one embodiment of the invention.

As shown in FIG. 5, the caddy 40 can act as a vehicle for holding, storing and carrying the above described bag holder 30, litter shovel 20 and/or a plurality of bags 5, in addition to other items, as desired by a user. As such, upon placing the shovel 20 and bags 5 into the storage box 50, the bag holder 30 can be placed onto the caddy 40 wherein the storage box 50 is protruding into the interior space of the storage box 30 so as to restore the bottom panel 41.

As described herein, one or more elements of the litter box cleaning kit 10 can be secured together utilizing any number of known attachment means such as, for example, screws, glue, compression fittings and welds, among others. Moreover, although each of the above embodiments have been described as including separate individual elements, the inventive concepts disclosed herein are not so limiting. To this end, one of skill in the art will recognize that each of the individual elements such as the shovel 20, bag holder 30 and caddy 40, including all subcomponents, can each be formed as single continuous elements, either through manufacturing processes, such as welding, casting, or molding, or through the use of singular pieces of material milled or machined with each of the aforementioned components forming identifiable sections thereof. Accordingly, in one preferred embodiment, each of the shovel 20, the bag holder 30 and the caddy 40 can be constructed from individual molds of injection molded plastic, each having complementary dimensions for working in unison, as described above.

Although described above as being constructed from plastic, other construction materials such as metal, PVC and wood, for example can also be utilized herein. Finally, it is noted that each of the kit articles can be constructed from the same, or different materials forming the identifiable sections described above.

Although each of the bag holder 30, caddy 40 and storage box 50 are illustrated as including generally rectangular shapes, one of skill in the art will recognize that the inventive concepts disclosed herein can take other conventional shapes such as a square or circle, for example without requiring undue experimentation. Accordingly, the invention is not to be limited to only rectangular shapes. Accordingly, the litter box cleaning kit 10 described above can act to provide a plurality of tools for maintaining and cleaning a litter box in a compact, space saving manner that is easy to use and locate.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A litter box cleaning kit, comprising:
  a litter shovel that includes
    a generally planar, nonporous bottom section terminating into a curved section having a plurality of openings therein,
    a pair of side walls having a generally orthogonal relationship with each of the bottom and curved sections, and
    an elongated handle having a generally parallel relationship with the bottom section;
  a bag holder that includes
    a front surface, a back surface, a first side surface and a second side surface, each forming a box having an open top, an open bottom and an interior area,
    each of said side surfaces further including an inward facing protrusion configured to engage a bag,
    wherein said box is configured to act as a frame for holding the bag in an open configuration; and
  a caddy that includes
    a flat, bottom surface having a pair of side walls, each of said side walls having a generally orthogonal relationship with said bottom surface,
    a handle secured to each of the side walls, and
    a storage box centered onto the bottom surface, said storage box being configured to store each of the litter shovel and a plurality of said bags,
  wherein said bag holder is configured to be removably placed onto the bottom surface of the caddy, and
  the interior space of the bag holder is configured to surround the storage box.

2. The kit of claim 1, wherein the plurality of openings on the shovel are configured to act as a sifter for removing litter from solid waste.

3. The kit of claim 1, wherein the nonporous bottom section of the shovel is configured to collect loose material of varying consistencies.

4. The kit of claim 1, wherein the handle of the bag holder is collapsible.

5. The kit of claim 1, wherein each of the side walls of the bag holder further include openings configured to allow access to the interior area.

6. The kit of claim 1, wherein said bag includes a conventional plastic shopping bag.

7. The kit of claim 1, further comprising:
  a vertical partition disposed within the storage box, said partition being configured to create a pair of separate storage areas within the storage box.

8. The kit of claim 1, wherein each of the shovel, bag holder and caddy are constructed from single molds of injected plastic.

* * * * *